US010767797B2

(12) United States Patent
Alberdi Bascaran (10) Patent No.: US 10,767,797 B2
(45) Date of Patent: Sep. 8, 2020

(54) FEMALE CONNECTOR OF A PLUG-IN CONNECTOR AND PLUG-IN CONNECTOR

(71) Applicant: CIKAUTXO, S. COOP., Berriatua (ES)

(72) Inventor: Aitor Alberdi Bascaran, Eiaber (ES)

(73) Assignee: CIKAUTXO, S. COOP, Berriatua (ES)

(*) Notice: Subject to any disclaimer, the term of this patent is extended or adjusted under 35 U.S.C. 154(b) by 538 days.

(21) Appl. No.: 15/656,817

(22) Filed: Jul. 21, 2017

(65) Prior Publication Data
US 2018/0031160 A1 Feb. 1, 2018

(30) Foreign Application Priority Data
Jul. 29, 2016 (ES) .................................. 201631053

(51) Int. Cl.
*F16L 35/00* (2006.01)
*F16L 37/084* (2006.01)
*F16L 37/088* (2006.01)

(52) U.S. Cl.
CPC ............. *F16L 37/084* (2013.01); *F16L 35/00* (2013.01); *F16L 37/088* (2013.01)

(58) Field of Classification Search
CPC ....... F16L 37/084; F16L 37/088; F16L 35/00; F16L 37/144; F16L 37/142; F16L 37/148; F16L 37/252
See application file for complete search history.

(56) References Cited

U.S. PATENT DOCUMENTS

| | | | | |
|---|---|---|---|---|
| 3,922,011 A | * | 11/1975 | Walters | ................. F16L 37/088 285/277 |
| 2005/0136741 A1 | | 6/2005 | Yoshida et al. | |
| 2016/0208752 A1 | | 7/2016 | Sasinowski et al. | |

FOREIGN PATENT DOCUMENTS

| | | | |
|---|---|---|---|
| DE | 102008046143 A1 | | 3/2010 |
| DE | 202014000313U U1 | | 4/2015 |
| EP | 0719971 A1 | | 7/1996 |
| EP | D691502 B1 | | 5/1999 |
| EP | 1319881 B1 | | 11/2005 |
| EP | 2902689 A1 | | 8/2015 |
| ES | 2110652T T3 | | 2/1998 |
| JP | 2013181558 A | | 9/2013 |
| WO | 2005045299 A1 | | 5/2005 |
| WO | WO-2014175401 A1 | * | 10/2014 ............ F16L 37/144 |
| WO | WO-2016021612 A1 | * | 2/2016 ........... F16L 37/1225 |

* cited by examiner

*Primary Examiner* — David Bochna
*Assistant Examiner* — James A Linford
(74) *Attorney, Agent, or Firm* — Edell, Shapiro & Finnan, LLC (57) ABSTRACT

A female connector and a plug-in connector comprising the female connector and a male connector that can be coupled to the female connector. The female connector includes a first end configured for being attached to a pipe or a hose and a second end configured for being connected to the male connector. The second end including elastic retention means configured for retaining the male connector inside the female connector. The female connector also includes a non-removable cover arranged at the second end of the female connector covering the retention means, preventing the retention means from being able to be manipulated from the outside of the plug-in connector.

11 Claims, 9 Drawing Sheets

FEMALE CONNECTOR OF A PLUG-IN CONNECTOR AND PLUG-IN CONNECTOR

CROSS REFERENCE TO RELATED APPLICATIONS

This application relates to and claims the benefit and priority to Spanish Patent Application No. P201631053, filed Jul. 29, 2016.

TECHNICAL FIELD

The present invention relates to connectors for rigid and flexible pipes and hoses wherein a male connector is coupled to a female connector.

BACKGROUND

Plug-in connectors comprising a female connector and a male connector are known, wherein each connector is fixed at one end to a pipe or a hose, the adapters interacting with one another for fluidically joining both pipes/hoses in a fast and efficient manner.

In connectors of this type, the free end of the female connector tends to comprise retention means cooperating with the male connector for retaining it inside the female connector. During insertion of the male connector, the retention means is elastically deformed and returns to its original position when the retention means contact a recess or groove arranged in the male connector, such that the male connector is retained by the elastic means.

In this sense, EP1671058 A1 discloses a plug-in connector for pipes and hoses formed by a male connector and a female connector. The male connector comprises a retention step surrounding the outer perimeter and comprising a slope that increases from the outer perimeter and a retention surface arranged thereafter behind the slope. The female connector comprises a U-shaped retention spring cooperating with the retention step. When the male connector moves forward in the direction of insertion, the slope pushes the retention spring which slides in the radial direction. When the retention spring contacts the retention surface, the retention spring returns to its original state retaining the male connector.

SUMMARY

A plug-in connector is provided that comprises a female connector and a male connector that can be coupled to the female connector. The female connector of the invention comprises a first end configured for being attached to a rigid or flexible pipe or a hose and a second end configured for being connected to the male connector. The second end comprises elastic retention means configured for retaining the male connector inside the female connector.

The female connector also comprises a non-removable cover arranged at the second end covering the retention means, preventing the retention means from being able to be manipulated from the outside, i.e., preventing the male connector from being able to be removed from the female connector once both (male and female) connectors have been coupled to one another, since it is not possible to access the retention means to reverse the coupling process, tampering being prevented.

These and other advantages and features will become evident in view of the drawings and the detailed description.

DETAILED DESCRIPTION

Figure 1:
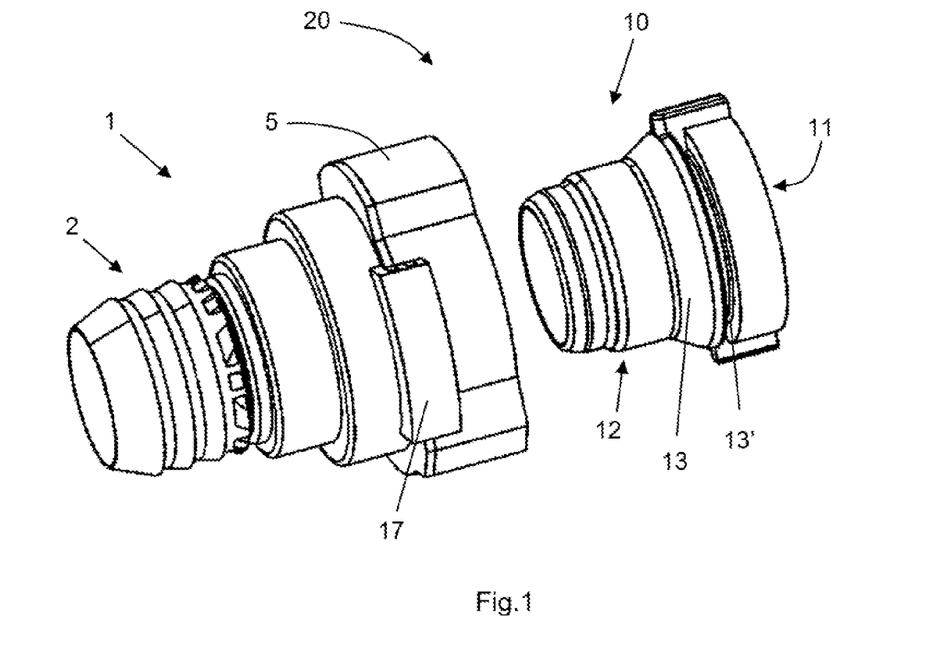
FIG. 1 shows a perspective view of a plug-in connector according to one embodiment, wherein the female connector and the male connector are not coupled to one another.

FIG. 1 shows a plug-in connector 20 according to one embodiment. As shown in the figure, the connector 20 comprises a female connector 1 and a male connector 10 that can be coupled to the female connector 1. Both the female connector 1 and the male connector 10 are configured for being attached at a first end 2 and 11 to a rigid or flexible pipe or a hose (not shown in the drawings), such that the plug-in connector 20 makes it possible to establish a quick and effortless fluid communication between both pipes/hoses.

Both connectors 1 and 10 comprise a second end 3 and 12, respectively, the second end 12 of the male connector 10 being configured for being inserted into the second end 3 of the female connector 1.

The second end 3 of the female connector 1 comprises elastic retention means 4 which is configured for retaining the male connector 10 inside the female connector 1.

The use of plug-in connectors is very common in the automotive sector, for example. In a non-limiting example, one of the pipes/hoses could be connected to the rocker cover of a vehicle's engine and the other pipe/hose could be connected to the engine intake circuit, such that direct discharge of oil and fuel vapors generated during combustion into the atmosphere is eliminated by reusing these gases in the combustion cycle.

The female connector 1 also comprises a non-removable cover 5 arranged at the second end 3 covering the retention means 4, thereby preventing the retention means 4 from being able to be manipulated from the outside and therefore, the male connector 10 from being able to be removed from the female connector 1. Once both (male 10 and female 3) connectors have been coupled to one another, it is not possible to access the retention means 4 and therefore, not possible to reverse the coupling process, thereby preventing any tampering, making the fluid connection more secure. Oil and fuel vapors not being reused for the purpose of increasing engine power by discharging them directly into the atmosphere is therefore prevented, for example.

Figure 2:
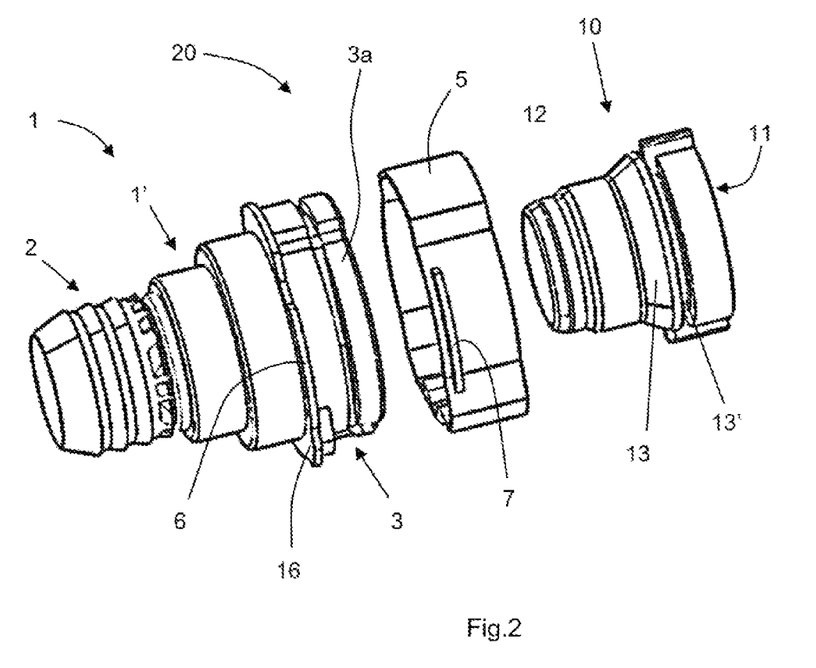
FIG. 2 shows a perspective view of the plug-in connector of FIG. 1, wherein the male connector has yet to be coupled and the cover of the female connector has yet to be placed.
Figure 4:
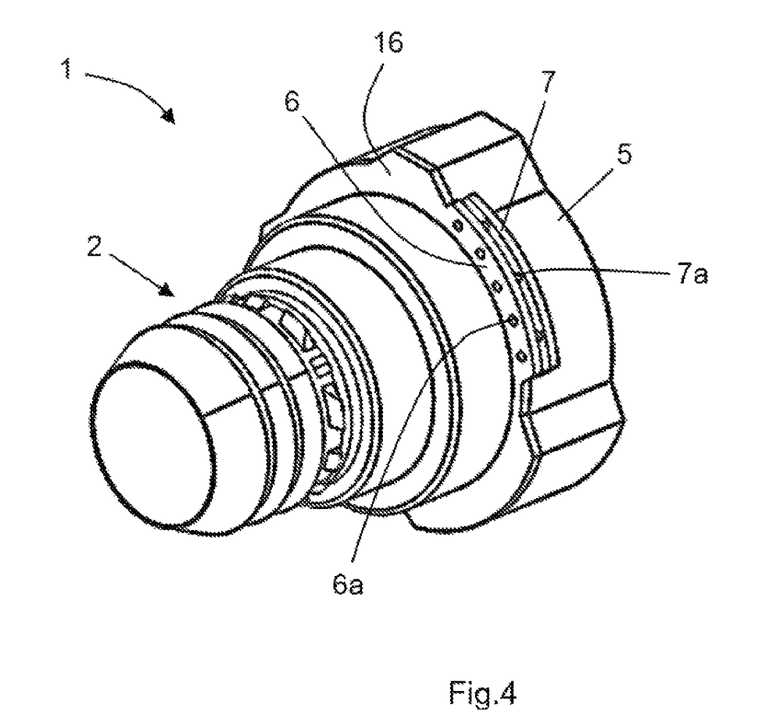
FIG. 4 is a perspective view of the female connector of FIG. 3 before fixing the cover permanently to the female connector.

Once the retention means 4 has been arranged at the second end 3 of the female connector 1 in a first step, the cover 5 is placed on the second end 3 such that the cover 5 covers the retention means 4, and the cover 5 is finally permanently attached to the female connector 1 at least in a contact area between the second end 3 and the cover 5, as will be described in detail further below. FIG. 2 shows a perspective view of the plug-in connector 20 according to one embodiment before placing the cover 5 on the second end 3 of the female connector 1. In contrast, FIG. 4 shows a perspective view of the female connector 1 according to one embodiment wherein the cover 5 is arranged on the second end 3 of the female connector 1, but before being permanently attached to the female connector 1.

Figure 5:
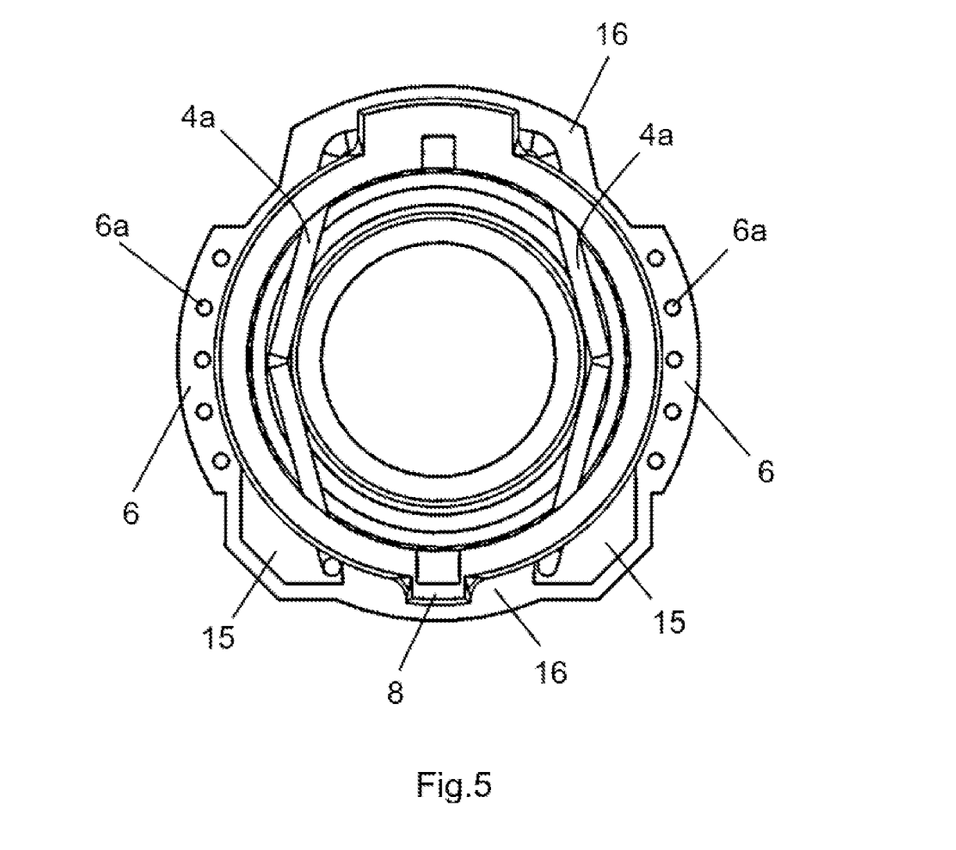
FIG. 5 is a front view of the female connector of FIG. 3 but without the cover.
Figure 6:
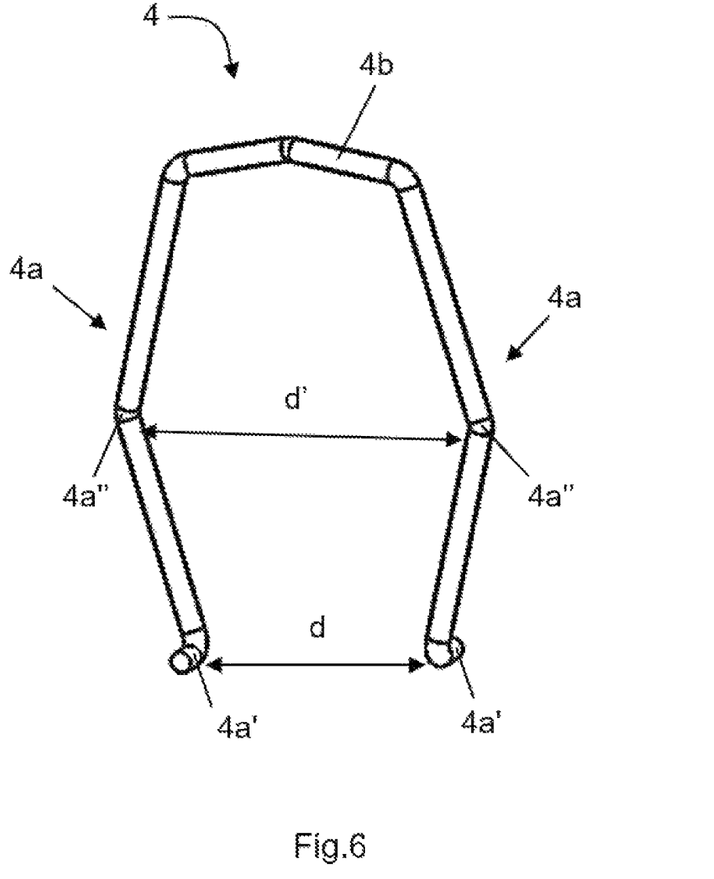
FIG. 6 is a perspective view of the retention means of the female connector of FIG. 1.

As shown in FIG. 6, the retention means 4 comprises an elastic rod, preferably U-shaped, comprising a central segment 4b and two side retention arms 4a. In turn, the second end 3 of the female connector 1 comprises two side grooves 14 in which the retention arms 4a are at least partially housed, at least part of the retention arms 4a being located inside the second end 3, as shown in FIG. 5, for retaining the male connector 10. The retention arms 4a are radially moved pushed by the second end 12 of the male connector 10 during insertion of the male connector 10.

The second end 12 of the male connector 10 according to the one embodiment comprises a recess 13' preceded by a slope 13. During insertion of the male connector 10 into the female connector 1, the slope 13 pushes the retention means 4 causing the arms 4a to move outward. When the retention means 4 contacts the recess 13', the retention arms 4a return to their original position, the retention arms 4a being housed in the recess 13' and thereby locking the male connector 10 in position.

As shown in FIG. 6, the free end of each retention arm 4a comprises a curved and bent end 4a' which is arranged on the outside of the second end 3. The bent ends 4a', together with the central segment 4b, allow locking the retention means 4, in the direction of insertion of the retention means 4.

According to one embodiment the two bent ends 4a' are arranged in opposite directions, as seen in FIG. 6, although they could also be arranged in the same direction.

The female connector 1 comprises a respective enclosure 5a for each end 4a' of the retention arms 4a where the corresponding end 4a' is housed, the ends 4a' being able to move into the respective enclosure 5a during insertion of the male connector 10 into the female connector 1.

The respective enclosures 5a are formed when the cover 5 is arranged on the second end 3 of the female connector 1, each enclosure 5a being demarcated by the second end 3 and the cover 5.

Figure 7:
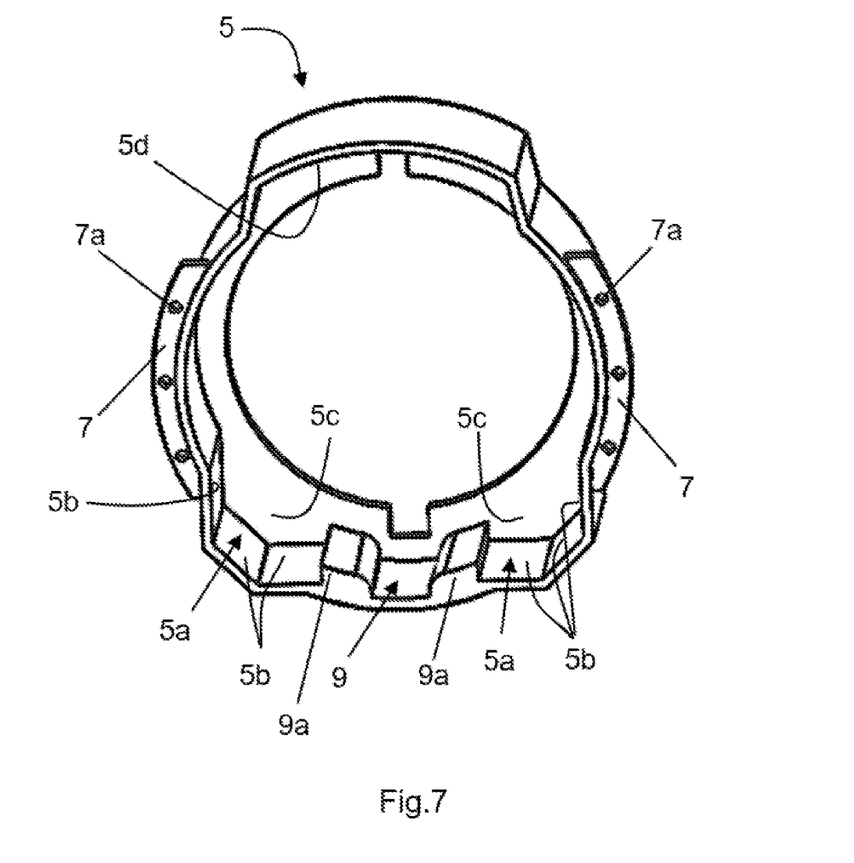
FIG. 7 is a perspective view of the cover of the female connector of FIG. 1.

According to one embodiment, as shown in FIG. 7, the cover 5 comprises a guiding channel 9 which allows guiding and centering the cover 5 with respect to the female connector 1. To that end, the second end 3 of the female connector 1 comprises at least one protuberance 8 cooperating with the guiding channel 9. According to one embodiment the protuberance 8 is arranged between the two side grooves 14, and when the retention means 4 are assembled on the second end 3 of the female connector 1, the protuberance 8 is also arranged between the ends 4a' of the retention arms 4a. In one embodiment the protuberance 8 projects radially and extends axially over the second end 3 of the female connector 1.

The protuberance 8 is preferably arranged in the lower part of the end 3 of the female connector 1, i.e., in the lower part according to the direction of insertion of the retention means 4. The protuberance 8 of the second end 3 is housed in the guiding channel 9. It is also possible to include more than one guiding system which includes another protuberance that is housed in another guiding channel, for example, in the upper part and/or on the sides of the cover 5. This embodiment includes a second protuberance 3b and a respective guiding channel 5d to which reference will be made further below.

According to one embodiment the cover 5 comprises a front face 5e with a hole coaxial with the second end 3 and a perimetral wall 5d attached to the front face 5e extending axially fitting in an outer surface 3a of the second end 3, such that the perimetral wall 5d surrounds the second end 3 along the perimeter thereof.

The guiding channel 9, shown in FIG. 7, comprises a recess arranged between two side walls 9a extending axially along the perimeter wall 5d.

According to one embodiment each enclosure 5a is demarcated by a cavity formed by the corresponding wall 9a, by a portion of the perimeter wall 5b of the cover 5, by a portion of the front face 5c of the cover 5 and by a portion of the outer surface 3a of the second end 3.

As seen in FIG. 7, each enclosure 5a is arranged in the lower part, to one side of the guiding channel 9. When the cover 5 is placed on the second end 3 of the female connector 1, each bent end 4a' is housed inside the corresponding enclosure 5a.

As described, when the male connector 10 is inserted into the female connector 1, the second end 12 of the male connector 10, in this embodiment the slope 13 of the second end 12, pushes the retention means 4 causing the arms 4a and their respective bent ends 4a' to move outward, i.e., each bent end 4a' is moved into the corresponding enclosure 5a such that each enclosure 5a must be sized accordingly, i.e., each enclosure 5a must allow the required movement of the corresponding bent end 4a' to allow for the insertion of the male connector 10.

According to one embodiment each retention arm 4a of the retention means 4 comprises two preferably straight segments that are attached to one another forming a bend 4a'', preferably at an intermediate point, such that each arm 4a can be a curved or arcuate arm, as seen in FIG. 6.

The distance d between the bent ends 4a' is less than the maximum separation distance d' of the retention arms 4a, such that the travel of the corresponding ends 4a' during insertion of the male connector 10 into the female connector 1 is minimized, oversizing the respective enclosures 5a thereby being prevented. In one embodiment, the maximum distance of separation d' between the retention arms 4a corresponds with the separation of the bends 4a'', therefore, as seen in FIG. 6, the bends 4a'' project outward.

In the preferred embodiment of the invention, the female connector 1 comprises another protuberance 3b projecting radially over a segment of the second end 3 and extending axially along the segment. The protuberance 3b comprises a housing 3b' which houses the central segment 4b of the metal rod, the central segment 4b being supported in the housing 3b'. The cover 5 in turn comprises an auxiliary guiding channel 5d which is arranged on the protuberance 3b, cooperating with the guiding channel 9 for guiding and centering the cover 5 with respect to the female connector 1.

The second end 3 of the female connector 1 comprises a radially projecting stop surface 16, as seen for example in FIGS. 2 and 5, surrounding a segment of the contour of the second end 3 along the perimeter thereof. The cover 5 of the invention, preferably the perimeter wall 5d, is supported on the stop surface 16 when it is arranged on the second end 3, as seen in FIG. 4.

The cover 5 is permanently attached to the female connector 1, i.e. such that it cannot be removed, the perimeter wall 5d of the cover 5 adhering to the second end 3 in at least part of the contact perimeter between the perimeter wall 5d and the stop surface 16.

In an embodiment not shown in the drawings, the female connector 1 and the cover 5 are adhered to one another along the entire contact perimeter between the perimeter wall 5d and the stop surface 16. However, in one embodiment the female connector 1 and the cover 5 are adhered to one another only in a part of the contact perimeter between the perimeter wall 5d and the stop surface 16, as described in detail below, so economic savings is achieved.

The cover 5 comprises at least one fin 7 which projects radially from the perimeter wall 5d and the stop surface 16 comprises a respective radial prolongation 6 that is arranged close to the fin 7, the fin 7 and the radial prolongation 6 being the preferred attachment areas. In one embodiment the cover 5 comprises two fins 7 each arranged on one side, as shown in FIG. 7, and the stop surface 16 comprises two respective radial prolongations 6, as shown in FIG. 5.

Several methods, such as for example the use of adhesives, welding, for example ultrasonic welding or hot plate welding, can be used to permanently attach the second end 3 and the cover 5, either in the entire contact perimeter or in the preferred attachment areas between the perimeter wall 5d of the cover 5 and the stop surface 16. However, in one embodiment the second end 3 and the cover 5 are attached by overmolding by adding a filler material 17, preferably plastic. After placing the cover 5 on the second end 3 in a previous step, the filler material 17 is molded over each pair of fin 7 and radial protuberance 6.

To facilitate the adherence of the filler material 17 and assure the attachment between the second end 3 and the cover 5, each fin 7 and the respective radial protuberance 6 comprise perforations 6a and 7a which allow the filler material 17 to penetrate the perforations 6a and 7a, thereby favoring not only a chemical attachment but also a mechanical one.

Figure 3:
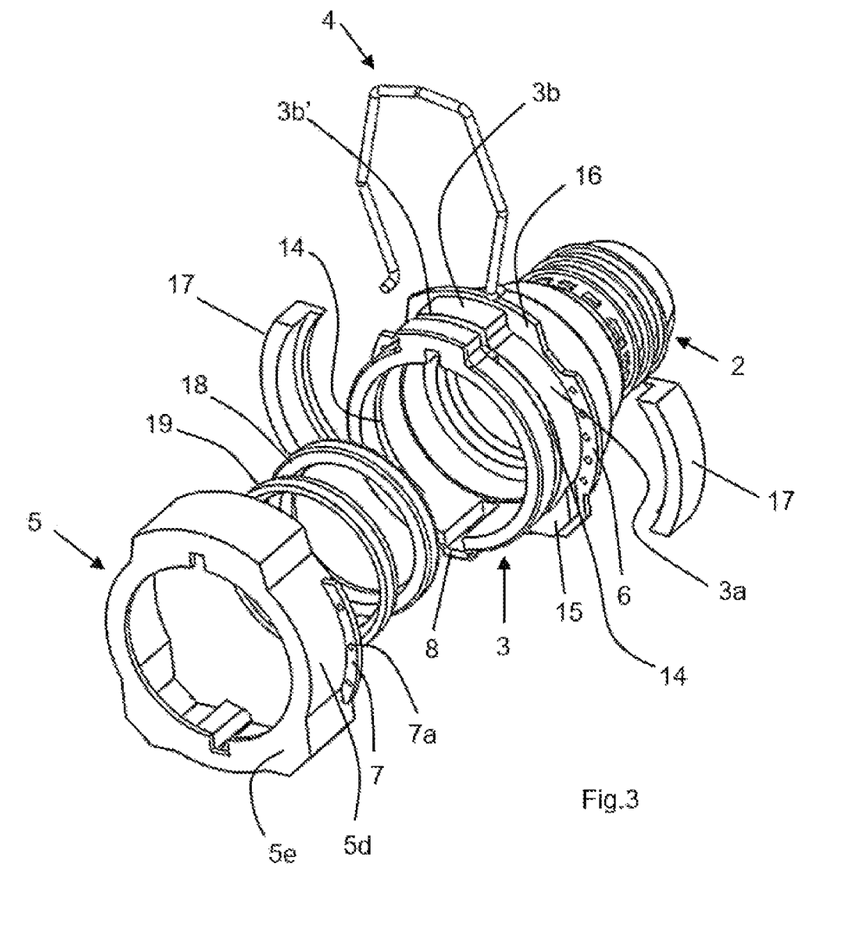
FIG. 3 is an exploded perspective view of the female connector of FIG. 1.

The exploded view of FIG. 3 depicts the filler material 17 as a solid and independent element to favor understanding the drawings. However, as the skilled person knows, the filler material 17 is not an element that can be dismantled as such.

As already described, with the plug-in connector 20 it is not possible to reverse the process once the male connector 10 has been coupled to the female connector 1. In other words, it is not possible to remove the male connector 10 from the female connector 1 once the retention means 4 has locked the male connector 10 and the cover 5 has been fixed.

If, despite this, a user misuses same by attempting to uncouple both the male connector 10 and the female connector 1 and forcing the plug-in connector 20, the plug-in connector 20 would break, preferably at the first end 2 of the female connector 1, forcing the user to restore the connection by replacing the plug-in connector 20.

To ensure that the plug-in connector 20 breaks according to what has been described in the preceding paragraph, the first end 2 of the female connector 1 comprises a weakened area 2a which ensures that the female connector 1 will break if it is tampered with. In the preferred embodiment of the invention, the weakened area 2a is arranged in the segment of the first end 2 closest to the second end 3.

Figure 8:
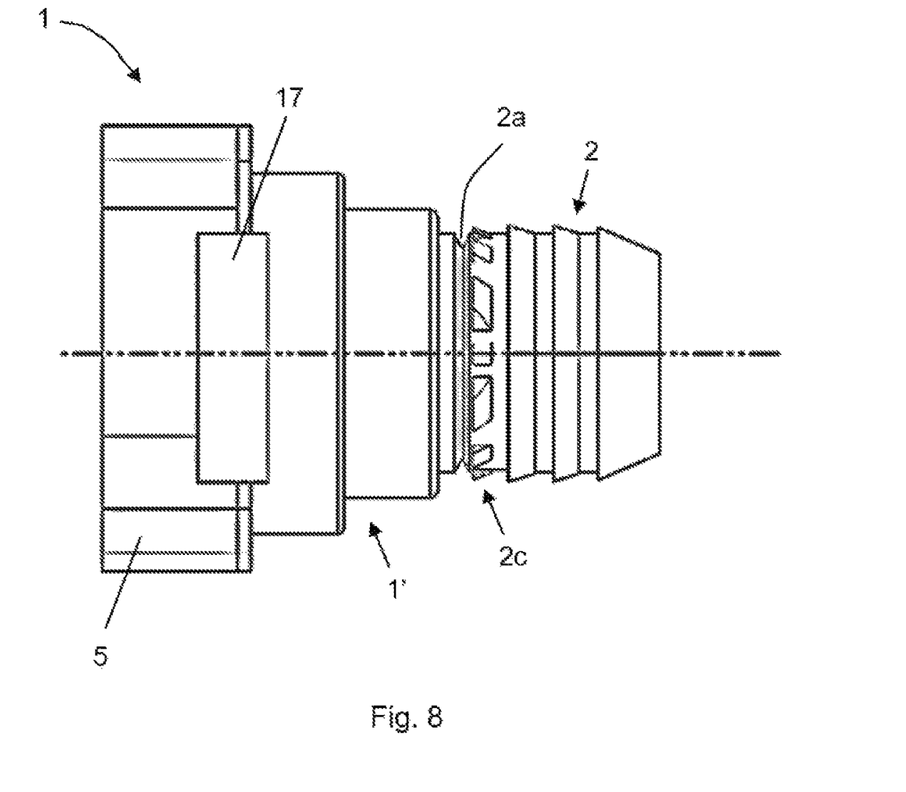
FIG. 8 is a side view of the female connector of FIG. 1.
Figure 9:
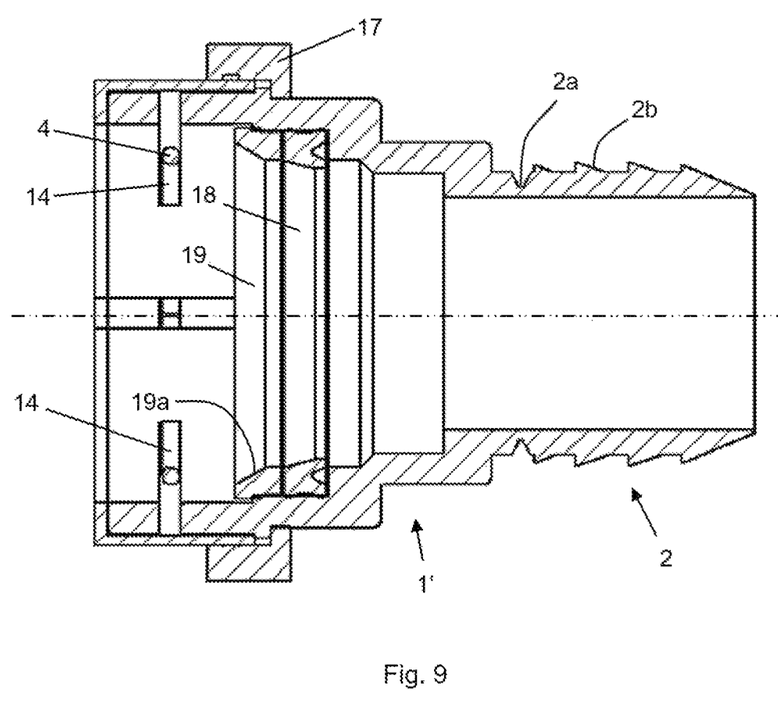
FIG. 9 is a view of the female connector of FIG. 1 according to the cutting section indicated in FIG. 8.

The weakened area 2a is a reduction of the section of a segment of the first end 2 of the female connector 1, as seen in FIGS. 8 and 9.

In one embodiment the first end 2 of the female connector 1 is in the shape of a bellows, i.e., it comprises a plurality of projecting slopes 2b radially surrounding the outer surface of the first end 2. The slopes 2b are oriented, i.e., increasingly, towards the second end 3. These slopes 2b makes it easier to fix the pipe/hose, not depicted in the drawings, arranged at the end 2.

In a non-limiting example, one of the slopes 2b, preferably the one closest to the second end 3, comprises a partially cut slope 2c preventing rotation of the pipe/hose fixed at the end 2.

In one embodiment the weakened area 2a is arranged between the slopes 2b, preferably after the partially cut slope 2c.

Like in the plug-in connectors of the state of the art, the female connector 1 comprises a sealing gasket 18, as seen in FIGS. 3 and 9, arranged inside the female connector 1, preferably inside the second end 3, assuring leaktight closure thereby preventing the fluid that may circulate through the inside of the plug-in connector 20 from leaking out.

To retain the sealing gasket 18 in its position, the female connector 1 also comprises an inner ring or washer 19 arranged adjacent to the sealing gasket 18. The inner washer 19 comprises an inner slope 19a to favor the insertion of the male connector 10, as seen in FIG. 9.

The female connector 1 comprises a central body 1' attaching the first end 2 and the second end 3, allowing a linear attachment between both ends 2 and 3 (as shown in the drawings), or a bent or angular attachment wherein an angle is allowed between both ends 2 and 3.

What is claimed is:

1. A female connector comprising;
a first end configured to be attached to a pipe or hose;
a second end configured to be connected to a male connector, the second end having housed therein a retention device configured to retain the male connector inside the female connector;
a central body located between the first and second ends; and
a cover permanently joined to the female connector at the second end covering the retention device preventing access to the retention device from an exterior of the female connector when the female connector is connected to the male connector;
the retention device comprising an elastic rod having a central segment and first and second side retention arms that each extend from the central segment, the second end of the female connector including first and second side grooves in which the respective first and second retention arms are at least partially housed, at least part of each of the first and second retention arms are configured to cooperate with the male connector to retain the male connector inside the female connector, the first and second arms having respective first and second ends that are located outside the central body of the female connector, the cover including first and second enclosures in which the first and second ends of the first and second retention arms are respectively housed, each of the first and second enclosures being demarcated by an end of the cover, the first and second ends of the first and second retention arms having a freedom of movement inside the respective first and second enclosures during an insertion of the male connector into the female connector;
the second end of the female connector including a protuberance arranged between the first and second ends of the first and second retention arms, the cover having a guiding channel in which the protuberance is housed.

2. The female connector according to claim 1, wherein the cover includes a front face with a hole coaxial with the second end of the female connector and a perimeter wall attached to the front face that at least partially surrounds an outer surface of the second end of the female connector, the guiding channel of the cover being demarcated by first and second walls, and the first and second enclosures being respectively demarcated by first and second cavities formed by the corresponding first and second walls, by a portion of the perimeter wall of the cover, by a portion of the front face of the cover, and by a portion of the outer surface of the second end of the female connector.

3. The female connector according to claim 2, wherein a maximum distance of separation exists between the first and second retention arms and the first and second ends of the first and second retention arms being separated by a distance, the distance separating the first and second ends of the first and second retention arms being less than the maximum distance of separation of the first and second retention arms such that movement of the first and second ends of the first and second retention arms is minimized during insertion of the male connector into the female connector.

4. The female connector according to claim 3, wherein each of the first and second retention arms includes a first end and a second end, the first and second retention arms respectively including a first bend and a second bend at an intermediate location between the first and second ends, the maximum distance of separation between the first and second retention arms being a separation distance between the first and second bends.

5. The female connector according to claim 2, further comprising a protuberance with a housing in which the central segment of the retention device resides, the cover comprising a respective guiding channel in which the protuberance is housed.

6. The female connector according to claim 2, wherein the second end of the female connector comprises a stop surface, the perimeter wall of the cover being supported on and adhered to at least a portion of the stop surface.

7. The female connector according to claim 6, wherein the cover comprises at least one fin that projects radially from the perimeter wall, the at least one fin being arranged close to a respective radial prolongation of the stop surface of the second end of the female connector, the at least one fin and the radial prolongation being attached to one another by a filler material that is over molded onto the at least one fin and the radial prolongation.

8. The female connector according to claim 7, wherein each of the radial prolongation and the at least one fin comprises perforations into which the filler material penetrates.

9. The female connector according to claim 6, comprising two side fins and two respective radial prolongations.

10. The female connector according to claim 1, wherein the first end of the female connector includes a weakened area that facilitates a breaking of the female connector.

11. The female connector according to claim 10, wherein the weakened area is a reduced cross-section at least in a segment of the first end.

* * * * *